United States Patent

Aschberger et al.

[15] 3,654,810
[45] Apr. 11, 1972

[54] CAN WELDING INDEXER

[72] Inventors: Anton A. Aschberger, Oak Lawn; Herbert D. Bartels, Palos Heights, both of Ill.

[73] Assignee: Continental Can Company, Inc., New York, N.Y.

[22] Filed: May 12, 1970

[21] Appl. No.: 36,541

Related U.S. Application Data

[62] Division of Ser. No. 793,271, Jan. 23, 1969, Pat. No. 3,544,743.

[52] U.S. Cl. ................................................................74/54
[51] Int. Cl. ..........................................................F16h 25/08
[58] Field of Search ..........................74/54, 604, 55; 219/64

[56] References Cited

UNITED STATES PATENTS

| | | | |
|---|---|---|---|
| 1,312,328 | 8/1919 | Johansson | 74/54 |
| 719,390 | 1/1903 | Stockall, Jr. | 74/54 |
| 2,052,380 | 8/1936 | Chapman | 219/64 |
| 3,110,195 | 11/1963 | Hanley | 74/604 |

*Primary Examiner*—Meyer Perlin
*Assistant Examiner*—Wesley S. Ratliff, Jr.
*Attorney*—Joseph E. Kerwin and William A. Dittmann

[57] ABSTRACT

An indexer for turning a can on which the seam has not been fully welded so that the welding current goes through different parts of the electrode as successive can seams are turned and the electrode erodes across a wide area instead of at one point. This prolongs electrode life.

7 Claims, 9 Drawing Figures

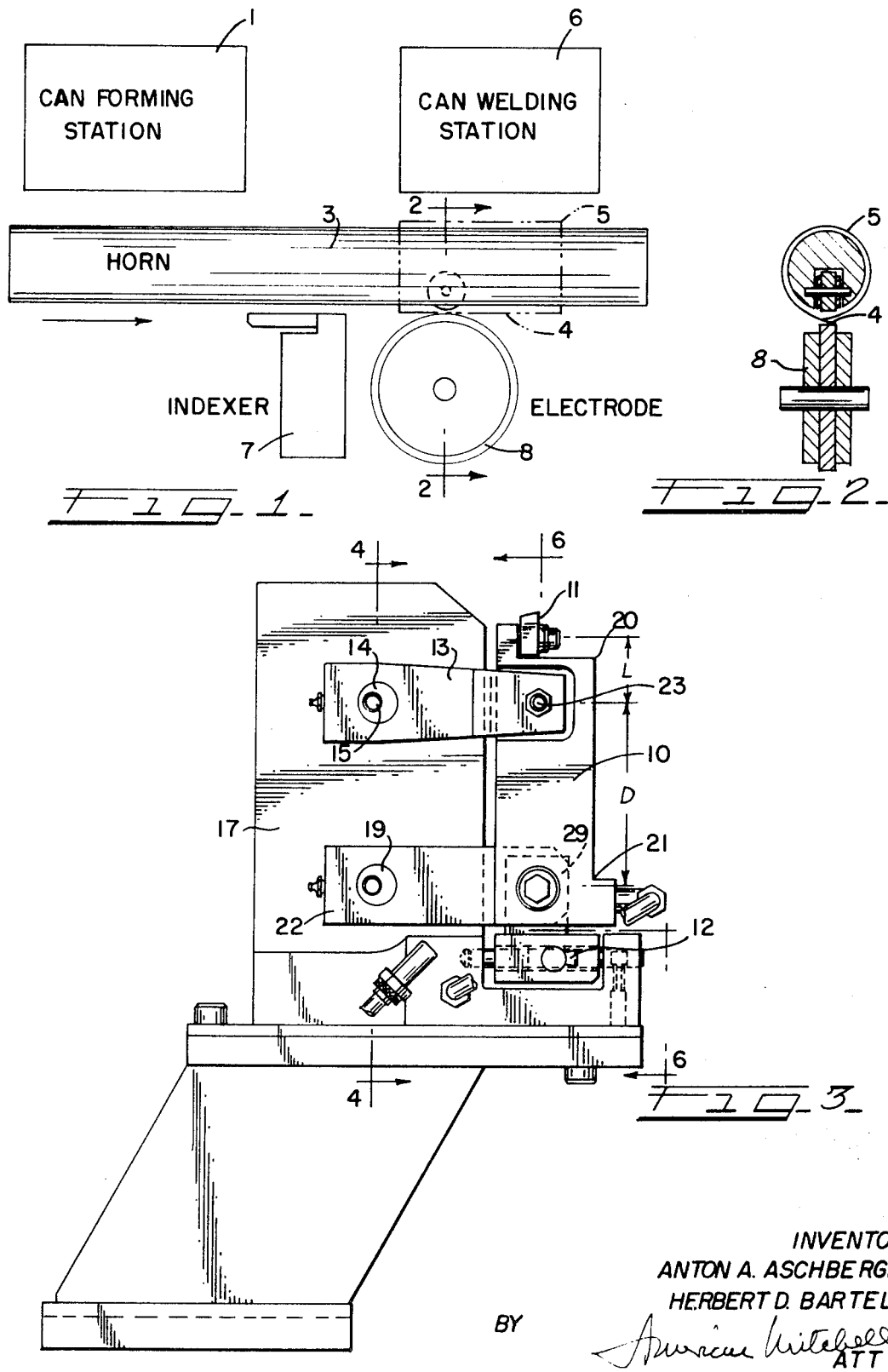

PATENTED APR 11 1972  3,654,810

INVENTORS
ANTON A. ASCHBERGER
HERBERT D. BARTELS
BY
ATT'Y.

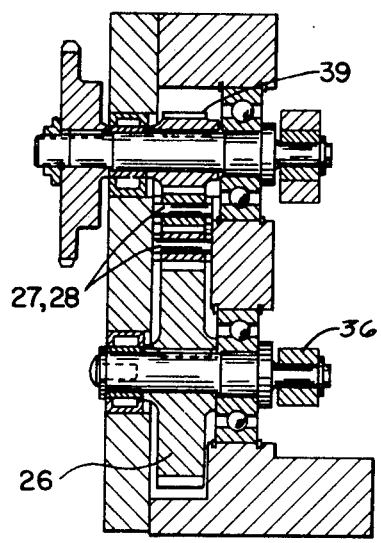
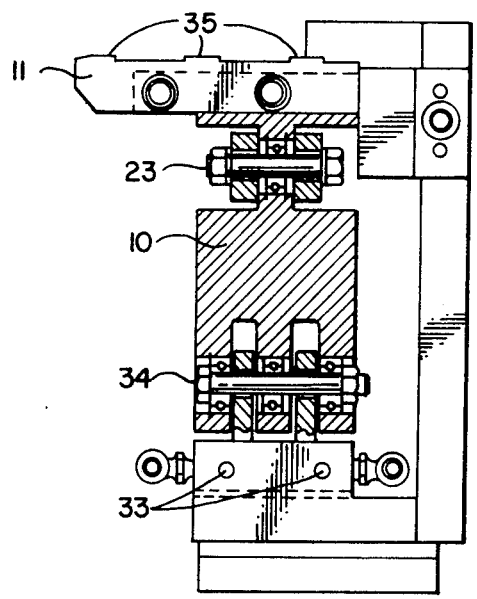
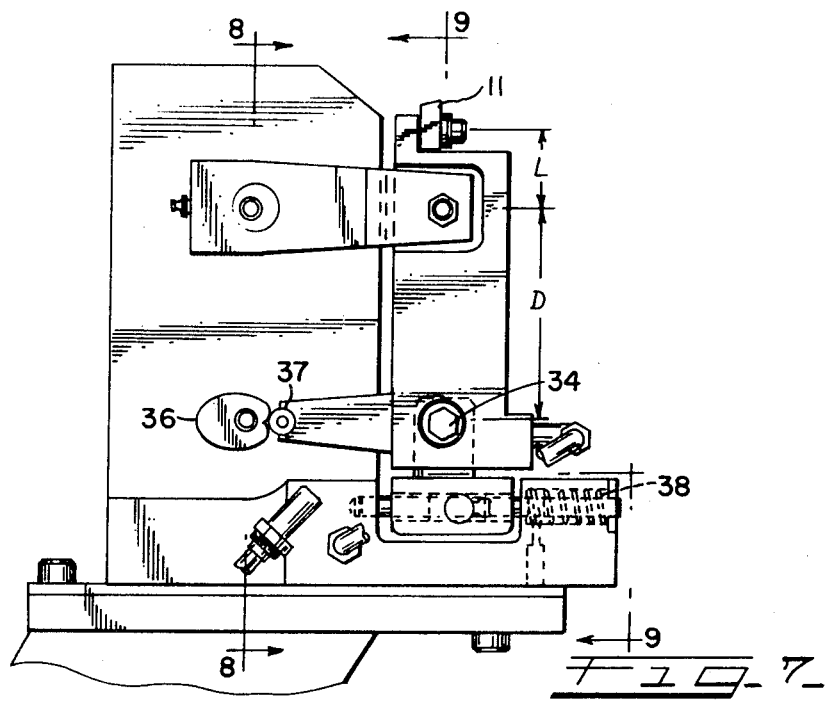

CAN WELDING INDEXER

This application is a division of application Ser. No. 793,271, filed Jan. 23, 1969, now U.S. Pat. No. 3,544,743, titled "Can Welding Indexer" with inventors Anton A. Aschberger and Herbert D. Bartels.

Our invention is drawn to a can weld indexer and particularly to a machine for turning successive can seams to various positions before welding the seams, thus prolonging electrode life.

Up to this time, the electrodes used in can seam welding have worn out fairly rapidly because the section of the electrode which conducts the welding current became eroded rather quickly. Can seams being welded pass by a certain spot on the welding electrodes in most of the machines in use today. The electrode contacts the can seam at about the same spot time after time and a furrow having a rather sharp edge is formed in the electrode. However, can blanks are of somewhat different size and consistency. For this reason, the can seam is not presented to the electrode in exactly the same way each time. When the electrode presses against the can seam, there may be different pressures against different parts of the seam. High electric current concentration at these pressure points causes uneven heating and may cause a burn through and a leaky can under pressure. The dual problems of electrode pitting or grooving and production of leaky cans are of long standing in the art.

It is a primary object of this invention to move or rotate each of successive cans a predetermined amount.

It is another object of this invention to spread electrode erosion and pitting over the surface of the electrode and prolong electrode life.

It is another object of this invention to avoid burnthrough of can walls.

It is a final object of this invention to weld successive cans evenly.

Other objects and advantages will become apparent from the following description taken in connection with the accompanying drawings in which:

FIG. 1 is a diagrammatic sketch of the sequence of operations of our invention.

FIG. 2 is a section view of an unwelded formed can body blank taken along Line 2—2 of FIG. 1.

FIG. 3 is a side view of the device of our invention.

FIG. 7 is a view of an alternate embodiment of our machine with a constant velocity rise cam.

FIG. 8 is a section view taken along line 8—8 of FIG. 7.

FIG. 9 is a section view taken along Line 9—9 of FIG. 7.

Figure 4:
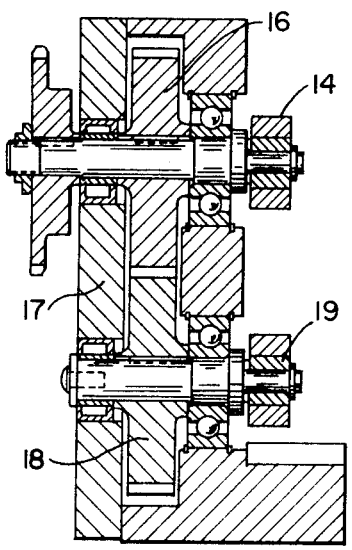
FIG. 4 is a section view of FIG. 3 taken along Line 4—4.

Briefly, our indexer spreads electrode wear across the face of a welding electrode by moving the unwelded side seam of successive cans back and forth across the electrode so that a different surface of the electrode is presented to each successive side seam. In order to do this, an elongated pusher element moves horizontally to catch the lip of the elongated element against the wing edge of the formed can and rotate the can a certain amount on the mandrel. The amount the can is rotated from can to can varies. The welding electrodes are now pressed against the can and as the can moves past the electrodes, the side seam of the can is welded. The elongated element is moved by rotating an eccentric cam, such as a constant velocity rise cam, to spread the electrode wear evenly across the face of the electrode.

Referring now more particularly to FIGS. 1 to 9, a description of the embodiments of my invention follows:

The generalized diagrammatic illustration of a section of a can body forming machine is shown in FIG. 1, where a wing forming station 1 bends the can blank 5 down around a mandrel 3 to form an overlapping wing 4 of the can body 5 at the bottom. After the can has been formed around the mandrel, it is moved along to a can welding station where it is welded. Various stations may be located and a variety of operations may be carried out between the wing forming station and the can welding station. The indexer 7 which is the subject of this invention is located in the space between the wing forming station and the can welding station. The outer portion of the overlapped section of the formed can 5 sticks out a bit (FIG. 2). The indexer 7 rotates the can 5 a predetermined small amount on the mandrel 3. The amount of the movement is usually on the order of a few thousandths of an inch. The can then moves at a moderately rapid pace past the electrode 8 and is pressed between the electrode and the electrode mandrel wheel 9 to weld the can seam. As shown in FIG. 2, the outside overlap can body edge presses against the electrode 8 and the current coming from the electrode is, to some extent, concentrated at that point. This causes the electrode to erode and pit along the line of the can body blank edge 4. If the successive can body blanks are presented to the can welding station with the same orientation, a groove is worn in the electrodes fairly rapidly at the point of current concentration.

When a succession of cans are formed on the mandrel, the overlap of various cans is not always of exactly the same size or of the same location on the mandrel. In this way, when the edges forming the can overlap are pressed together, a grossly unequal pressure is applied across the overlap. The overlap parts which are pressed into contact with each other most firmly conduct electricity most readily and consequently, the heating tends to be concentrated in one area or another. The large welding current passing through a small section of the can body overlap may cut longitudinal fissures through the can body. When pressure is applied inside such a can, it is found to be leaky.

In order to avoid the detrimental results set forth in the paragraph above, our indexer 7 moves the can body slightly each time a new can passes the indexing station. By moving the can body, the point of contact of the can seam to the electrode is determinable and is different with each succeeding can. This change distributes the electrode wear over a moderately wide electrode surface area and avoids the concentration of erosion which causes a groove in the electrode and the burning of fissures into the can body seam.

An embodiment of our can welding indexer is shown in FIG. 3 where the can indexer is mounted upon the main base of the can welding line.

The embodiment of our invention shown in FIG. 3 has a vertical elongated member 10 adapted to reciprocate to and fro as each can is presented to the indexing station. This element has a pusher element 11 mounted on it. Pusher element 11 is made of a fairly hard material to avoid wear. The pusher element presses against the edge 4 of the can body blank as pointed out above and moves the can body blank wing and edge a predetermined distance, thus turning the can on mandrel 3.

Underneath the vertical elongate member 10 is a trunnion element 12 mounted to slide on two rods. The vertical member 10 is pivotally connected to an upper connecting link 13 which connects the upper end of the member to a first eccentric cam 14. The cam is pinned to a shaft 15 (FIG. 4) extending through a rotary motion transmitting means 16, such as a gear mounted inside the gear box 17 or gear mounting means. This gear rotates another gear 18 below it to operate a second eccentric 19 which is synchronized with the first eccentric. The two eccentric cams 14, 19 control the relative movement of the upper 20 and lower 21 portions of the vertical member through their respective link means 13, 22.

Figure 5:
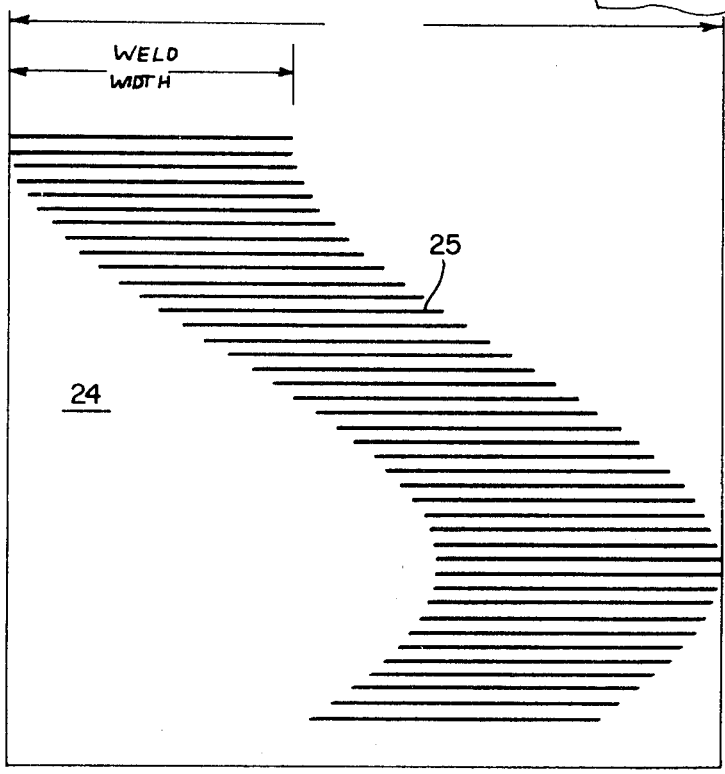
FIG. 5 is a bar diagram showing weld location and seam rotation distance of successive cans.

In order for the pusher element 10 to be moved a varying distance each consecutive time, the first eccentric 14 turns through a full 360° cycle each time a can passes in front of the pusher element. During this cycle, the lower or second eccentric 19 rotates one time plus or minus a small amount, or it may rotate clockwise or counterclockwise through a small angle only for each complete rotation of the first eccentric. In any case, the first eccentric 14 moves the first pivot point 23 of the vertical member 10 through a predetermined distance during each rotation. However, because the second eccentric moves more or less than a full rotation, the top 20 of the pusher element moves slightly one way or the other at each full rotation of the first eccentric. In this case, the first pivot point 23 is the fulcrum and the lengths L and D plus the cam sizes and the relative cam rotations determine the difference in the amount of movement of the top of the pusher element. Taking the section 4—4 of FIG. 3 which is shown in FIG. 4 of the drawings, the gear 16 mounted on the drive shaft of the first eccentric has 60 teeth, whereas the gear 18 mounted on the drive shaft of the second eccentric has 59 teeth. In this case, for each full rotation of the upper gear, there is a full rotation plus 1/59 rotation of the lower gear. Looking at the situation shown in FIG. 3, the lower pivot point moves slightly back toward the main body of the apparatus causing the lip to advance slightly. The next full rotation of the upper eccentric causes the lower pivot point to move back again somewhat. As the upper eccentric continues its rotation, the movement of the lip traces a path back and forth in the area 24 to the left of the horizontal lines (FIG. 5). The position of the 0.040 inch seam as to the electrode face is shown by the darkened horizontal lines 25. Obviously the relative number of teeth can be varied to give other patterns. Also, as shown in FIG. 8, the lower gear 26 could be made quite large with perhaps a number of intervening gears 27, 28 between the upper and lower gear. In this case, the lower eccentric, instead of rotating a full turn plus a small part of the turn or a full turn minus a small part of a turn, would rotate only a very small amount, but the net effect is about the same.

Figure 6:
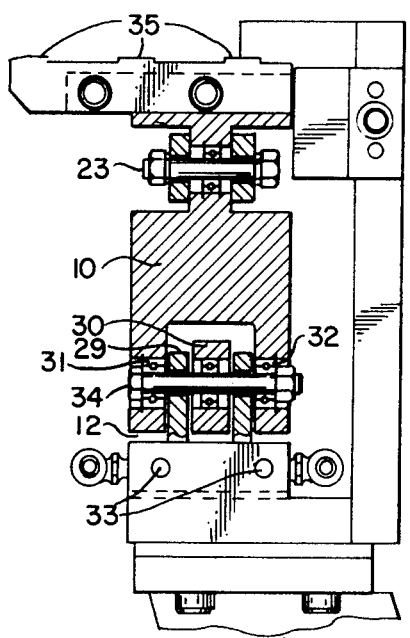
FIG. 6 is a section view of FIG. 3 taken along Line 6—6.

Taking another view of the apparatus as seen in FIG. 3 along cross-section Line 6—6, FIG. 6 shows the shape of the vertical elongated member 10 and shows it to be bifurcated at its lower extremity so that a part of the slideable trunnion element 29 projects into the center of the bifurcated elongated member to give it stability. Here the lower link 22 is shown to be a single member 30. To each side of the single lower link on the shaft are trunnion element bearing members 29 and outside the trunnion element bearing members are bearing elements 31, 32 of the elongated member. The lower trunnion element is slideable upon two guide rods 33 fixed to the base of the machine. In this embodiment as shown, the elongated member is restrained from vertical movement by its pivot point 34 in the trunnion element which slides laterally on its guide rods and the elongated member is restrained from lateral movement at its pivot point by the lower connecting link. Movement of the upper pivot point 23 is controlled by horizontal movement of the upper connecting link. This link is shown as bifurcated at its distal point to give stability to the movement of the pusher. The pusher element 10 has three or more lip extensions 35 at its upper end to turn a can. When the three lip extensions 35 catch the can overlap, they turn the can a certain amount on the mandrel.

The showing of FIG. 5 is directed to the indexer having off-center round cams (FIG. 3). It is noted that with this type cam, the increment between successive movements of the lip in the middle of the pattern of traverse is greater than at the ends. This means that a higher percentage of welding is done at the ends of the weld area than is done in the center part of the weld area. Thus, there is somewhat more wear at both ends of the weld area than there is in the center. It is apparent that this pattern is an improvement over a straight pattern with a single straight dug-out groove. However, the electrode pitting and erosion from this device does not leave a smooth finish. After a certain number of cans have passed, trenches are dug into the electrode at each end of the traverse and fissures forming in the can wall may cause leaky cans.

In order to produce a more even wear pattern on the electrode surface, the embodiment of our invention shown in FIG. 7 may be used. This embodiment is substantially identical to the embodiment shown in FIG. 3 with the exception that the lower or second eccentric cam is in the form of a constant velocity rise cam 36. In this type of cam, each increment of rotation of the constant rise cam displaces the follower 37 an equal amount. The follower 37 must be spring biased against the constant velocity rise cam and for this reason, a spring 38 under compression is mounted to bear against the trunnion and keep the follower pressed against the constant velocity rise cam. In this case, as in the first embodiment, the trunnion bushing slides on two guides 33 and may move through the full extent of the traverse left or right, depending upon the position of the constant velocity rise cam.

A preferred embodiment of the gearing of this arrangement is shown in FIG. 8, a cross-section taken along Line 8—8 of FIG. 7. Here a small gear 39 is mounted on the shaft of the first eccentric and is geared down to about a 1:20 ratio with the lower gear 26. Obviously, any gear ratio could be employed depending upon the amount of difference in the movement of the lip extension which is desired for rotation of each successive can. The relative size of the cams, the relative distances L to D and the gear ratio determine the movement of the advance or retreat of the lip extension with successive cans as in the other embodiment. The location of the springs around the guide rods and adjacent the trunnion is shown most clearly in FIG. 7. These springs 38 are under compression to keep the follower pressed against the cam as it rotates. In this embodiment, the follower 37 is fastened to the elongate member and is not directly attached to the pivot point 34 (FIG. 9). Lateral motion is transmitted from constant rise cam 36 to follower 37 to elongate member 10 and then to pivot point 34.

A principal advantage of our welding indexer is that a fairly even path is worn across the electrode giving longer electrode life. Also, sharp ridges across the electrode are avoided so that electrode burns do not occur and no leaky cans are welded until the groove finally becomes excessive.

The foregoing is a description of illustrative embodiments of the invention, and it is applicant's intention in the appended claims to cover all forms which fall within the scope of the invention.

What is claimed is:

1. A welding indexer comprising:
a mounting means for mounting two parallel shafts for rotation;
a first and a second spaced shaft extending through said mounting means;
a first rotary motion transmitting means keyed to the first shaft;
a second rotary motion transmitting means of a different size from said first means and being keyed to the second shaft for being rotated by said first shaft rotary motion transmitting means at a different rate of speed from said first means;
first and second eccentric cams each keyed to one of said first and second shafts;
an elongated member spaced from said shafts;
first and second link means pivotally connected to a first and second portion respectively of said elongated member at a first end and being connected to said first and second eccentric cams respectively at a second end and movable in response to the rotation of said eccentric cams and shafts whereby the end of said elongated member moves a different distance for each successive revolution of said shafts;
trunnion means for pivotally supporting said elongated member;
guide means extending generally perpendicular to the axis of said elongated member and being mounted on the other side of said first link from said second link, and
bearing means in said trunnion means cooperating with said guide means for allowing said trunnion means to slide back and forth on said guide means.

2. A welding indexer as set forth in claim 1 in which:
a driving means is attached to said first shaft for rotating said first shaft in synchronism with a wing forming drive means whereby for each wing forming cycle, the can welding indexer goes through a complete cycle.

3. A welding indexer as set forth in claim 1 in which:

said first rotary motion transmitting means is much smaller than said second motion transmitting means.

4. A welding indexer as set forth in claim 3 in which:

intermediate motion transmitting means connects said first rotary motion transmitting means to said second rotary motion transmitting means whereby a substantial reduction of angular velocity is obtained between said first shaft and said second shaft.

5. A welding indexer as set forth in claim 3 in which:

said eccentric cam keyed to said second shaft is a constant velocity rise cam.

6. A welding indexer as set forth in claim 5 in which:

spring means press said trunnion pivot toward said eccentric cam.

7. A welding indexer as set forth in claim 6 in which:

a cam follower means is rigidly connected to said trunnion means for pressing against the constant rise cam and insuring that the elongated member follows the constant rise cam.

* * * * *